United States Patent
Sprinkle (10) Patent No.: US 6,799,936 B2
(45) Date of Patent: Oct. 5, 2004

(54) TOWER AND BOOM STRUCTURE FOR LOADER BUCKET

(75) Inventor: David Laverne Sprinkle, Warrenton, GA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/041,833

(22) Filed: Oct. 19, 2001

(65) Prior Publication Data

US 2003/0075375 A1 Apr. 24, 2003

(51) Int. Cl.$^7$ ................................................ B60K 1/00
(52) U.S. Cl. ........................ 414/686; 180/291; 37/235; 280/833
(58) Field of Search .................... 414/686; 37/235, 37/411, 399, 397; 112/811, 828, 431, 436; 180/291, 900, 69.2; 280/830, 834

(56) References Cited

U.S. PATENT DOCUMENTS

| | | | |
|---|---|---|---|
| 2,417,021 A | * 3/1947 | Simmonds | 414/717 |
| 2,468,602 A | * 4/1949 | Lord | 414/686 |
| 2,815,876 A | * 12/1957 | Rogers | 414/686 |
| 2,910,190 A | * 10/1959 | Baas | 212/347 |
| 3,207,341 A | * 9/1965 | Griffith et al. | 414/686 |
| 3,324,954 A | * 6/1967 | Westendorf | 414/686 X |
| 3,828,952 A | * 8/1974 | Klee | 414/686 |
| 3,949,889 A | 4/1976 | Moe | |
| 4,050,596 A | * 9/1977 | Zener et al. | |
| 4,345,870 A | * 8/1982 | Anderson et al. | 414/686 |
| 4,878,713 A | * 11/1989 | Zanetis | |
| 4,904,151 A | * 2/1990 | Biemens et al. | |
| 5,252,022 A | 10/1993 | Culp et al. | |
| 5,273,375 A | * 12/1993 | Plourde | 404/118 |
| 5,387,076 A | 2/1995 | Fuzzen | |
| 5,535,533 A | * 7/1996 | Romanchok | 414/686 X |
| 5,536,134 A | * 7/1996 | Hirooka | 414/686 |
| 5,967,737 A | 10/1999 | Kraske et al. | |
| 6,041,870 A | * 3/2000 | Zimmerman et al. | 172/811 |
| 6,071,066 A | * 6/2000 | Braud | 414/686 |
| 6,572,323 B2 | * 6/2003 | Schupback | 414/686 X |

FOREIGN PATENT DOCUMENTS

| | | | |
|---|---|---|---|
| DE | 1248551 | * | 8/1967 |
| GB | 1121146 | * | 7/1968 |
| JP | 57-205633 | * | 12/1982 |

OTHER PUBLICATIONS

Brochure: John Deere Backhoe Loaders 310E, and "Supplemental Information on the 310E".

* cited by examiner

*Primary Examiner*—Bryan Fischmann
(74) *Attorney, Agent, or Firm*—The Law Office of Randall T. Erickson, P.C.

(57) ABSTRACT

A utility vehicle having a front loader bucket includes shaped towers and shaped boom arms connected to the towers, and a sloped hood and a shaped fuel tank which all increase the operator's view of the bucket, wheels; axle and ground for close control of the utility vehicle bucket with respect to external structures and surfaces. The towers extend substantially vertically from the utility vehicle chassis to a mid-location wherein the towers are offset inwardly to top ends thereof. The boom arms are connected to the top ends of the towers, extend forwardly, and are offset outwardly to a mid-location of the boom arms wherein the boom arms then extend forwardly to be connected to the bucket.

20 Claims, 6 Drawing Sheets

TOWER AND BOOM STRUCTURE FOR LOADER BUCKET

TECHNICAL FIELD OF THE INVENTION

The invention relates to utility vehicles, particularly to utility tractors for industrial and agricultural use that incorporate a front loader bucket.

BACKGROUND OF THE INVENTION

Utility tractors include a front-mounted engine supported on a chassis and located in front of the driver. The engine is covered by a hood. The hood has an inverted U-shaped cross-section and is closed on a front end by a grille and on a back end by a firewall. The firewall is covered by a fuel tank and a steering console. Utility tractors that incorporate a front loader bucket include a support structure to support and brace movement of the loader bucket. The support structure includes two columns or towers arranged on opposite lateral sides of the fuel tank and steering console and extending substantially vertically, and a boom pivotally connected about a lateral axis to the towers at top ends of the towers. The boom is raised and lowered by a pair of hydraulic cylinders connected between the boom and towers.

The towers extend upwardly from the tractor chassis. The towers are spaced apart and located in the two spaces that are defined between the hood and the front wheels.

The present inventors have recognized that if the towers and booms are arranged narrowly spaced apart, close to the hood, driver visibility to observe the front axle and ground is impaired. The present inventors have recognized that this visibility is important because the front axle is typically the point of lowest ground clearance, the part that has the greatest chance of striking an obstacle beneath the tractor. The present inventors have recognized that if the towers and boom arms are placed widely spaced apart, close to the front wheels, driver visibility to observe the outside edges of the loader bucket is impaired. The present inventors have recognized that this visibility is important to allow precise finishing work by the loader bucket close to a structure without risking impact and damage to the structure. The present inventors have also recognized that it would be desirable to arrange the tractor hood to increase driver visibility to observe the top edge of the loader bucket. The present inventors have recognized that this visibility of the top edge of the bucket is important to sense whether the bucket is full by observing material spill over the top edge of the bucket, and is important to sense the bucket elevation and levelness.

SUMMARY OF THE INVENTION

The present invention provides a utility tractor having a front loader bucket, wherein the utility tractor has structural support components shaped to allow effective driver viewing of the front axle, the top of the bucket, and the side edges of the bucket.

Particularly, the tractor comprises shaped towers and boom arms that support and brace the loader bucket for movement. The towers are connected to the tractor chassis at a relatively wide spacing and extend upwardly to a position at which the hydraulic cylinders that control bucket raising and lowering are attached. The towers then curve, angle, are tapered or are otherwise offset, inwardly and then extend upwardly substantially in parallel to a point where the boom arms are connected to the towers.

The boom arms extend forwardly from their connection to the towers and then curve, angle, are tapered or are otherwise offset, outwardly to a wide spacing and then proceed forwardly substantially in parallel to the bucket connection. The tractor hood is sloped dramatically downwardly to allow improved visibility of the top of the bucket.

Because the hood is declined to a short front grille region, the grille region is wider to allow sufficient cooling area for the radiator. The boom arms are advantageously shaped to allow clearance for the wider hood at the grille.

The arrangement of the offset towers, offset boom arms and declined hood structure allows increased driver visibility to the front axle, increased driver visibility to side edges of the bucket, and increased driver visibility of the top edge of the bucket.

Numerous other advantages and features of the present invention will be become readily apparent from the following detailed description of the invention and the embodiments thereof, from the claims and from the accompanying drawings.

DETAILED DESCRIPTION OF THE PREFERRED EMBODIMENTS

While this invention is susceptible of embodiment in many different forms, there are shown in the drawings, and will be described herein in detail, a specific embodiment thereof with the understanding that the present disclosure is to be considered as an exemplification of the principles of the invention and is not intended to limit the invention to the specific embodiment illustrated.

Figure 1:
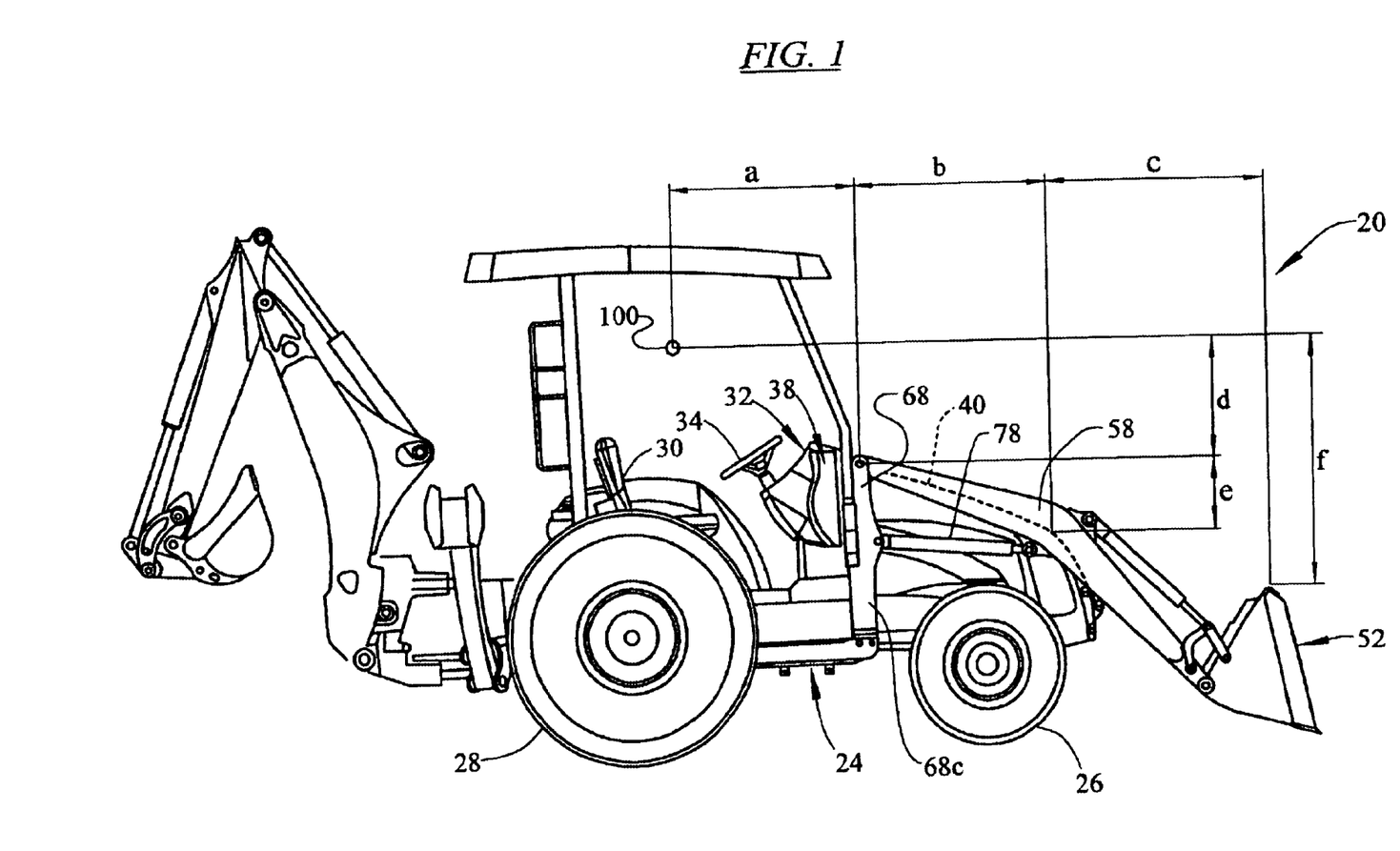
FIG. 1 is an elevational view of a tractor incorporating the present invention.
Figure 2:
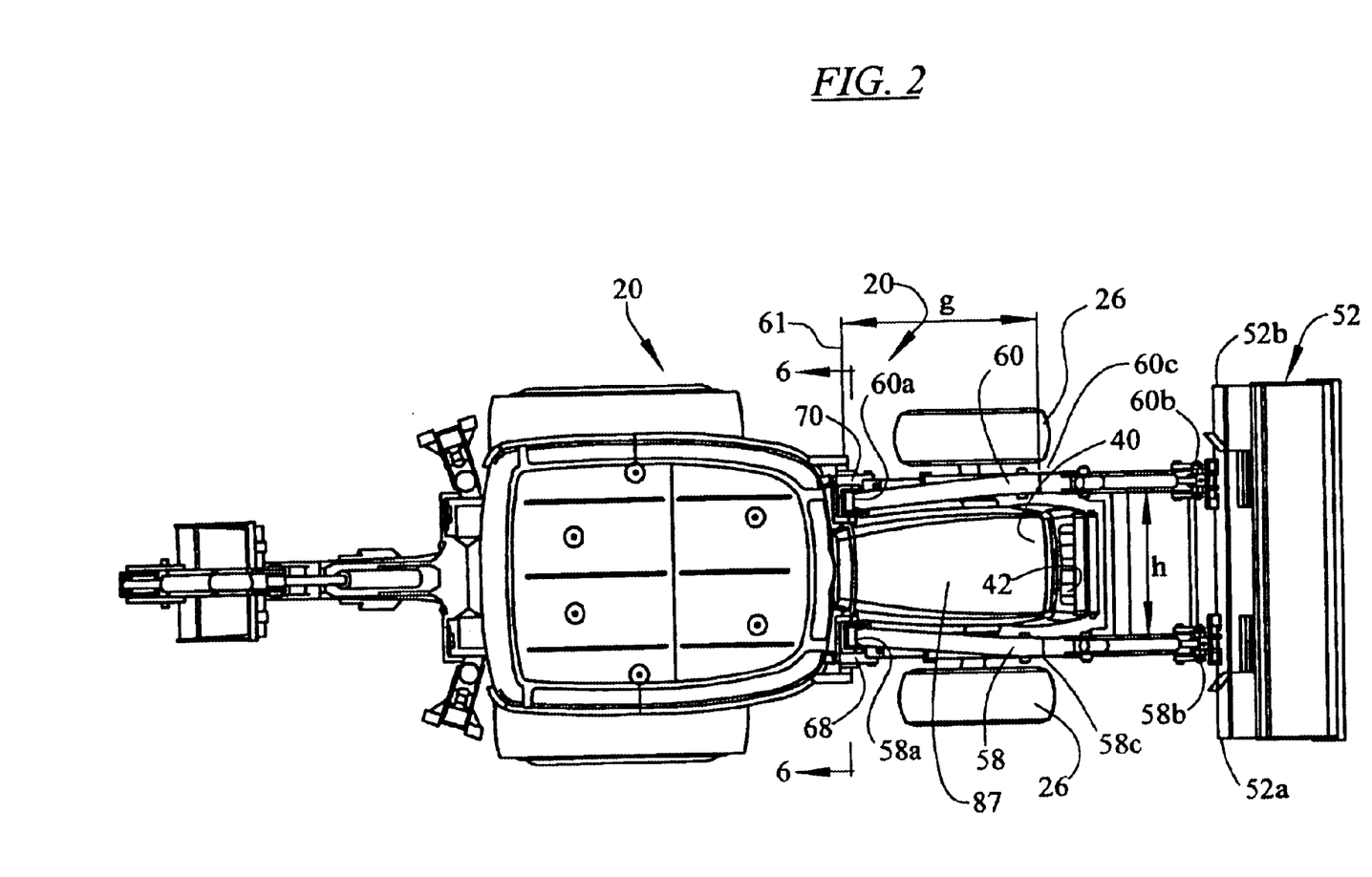
FIG. 2 is a top view of the tractor of FIG. 1.
Figure 3:
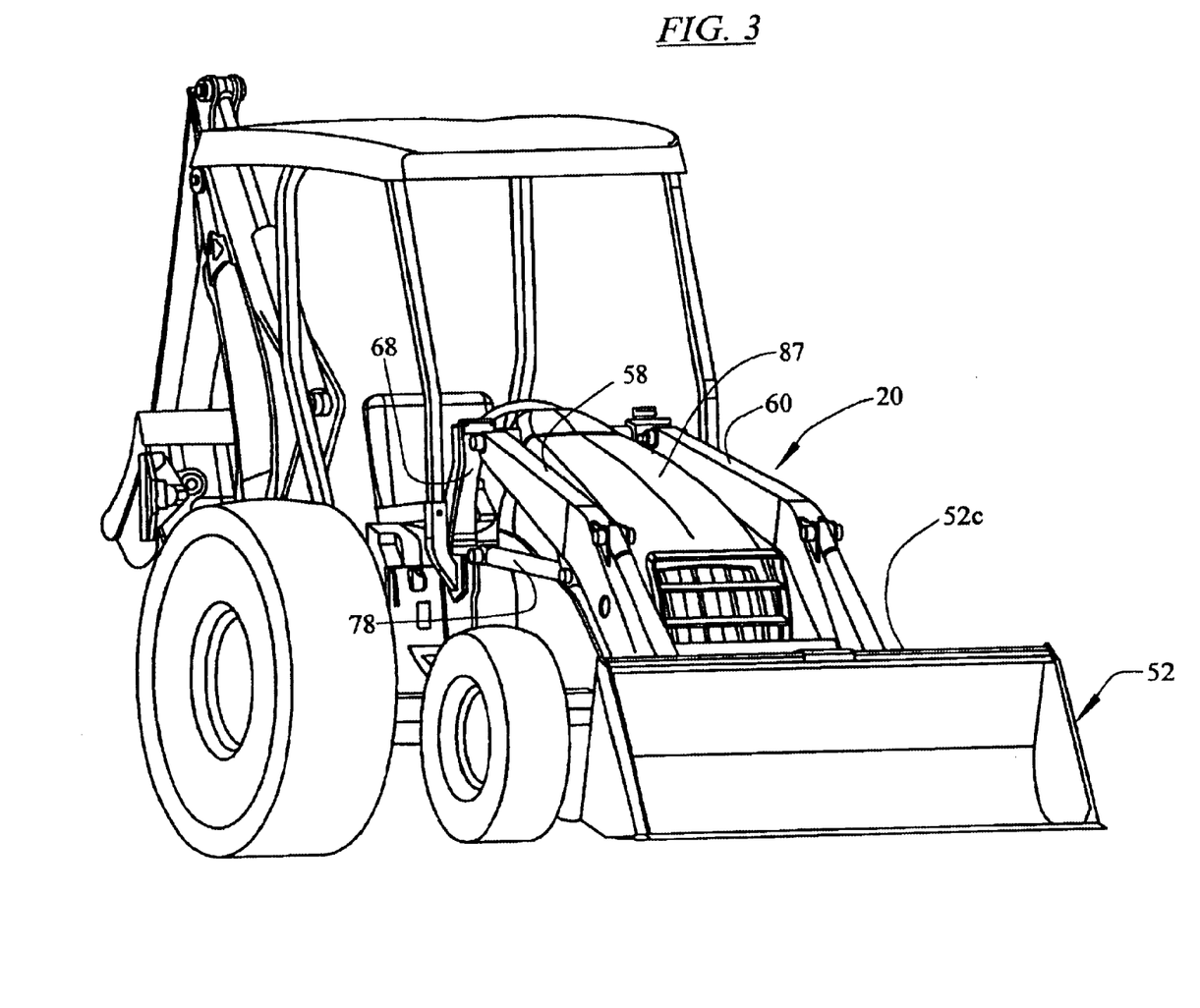
FIG. 3 is perspective view of the tractor of FIG. 1.

FIGS. 1 through 3 illustrate a tractor 20 incorporating features of the present invention. The tractor 20 includes a chassis 24 supported on front wheels 26 and larger rear wheels 28. The front wheels are carried on a front axle 27. A driver's seat 30 faces a steering console 32 that includes a steering wheel 34 and a fuel tank 38.

An engine (not visible in the Figures) is located forward of the steering console 32 beneath a hood 40. The hood 40 has a substantially U-shaped cross-section, closed by the steering console 32 at a rear of the hood 40, and by a grille 42 (shown in FIG. 2) at a front of the hood 40.

Figure 5:
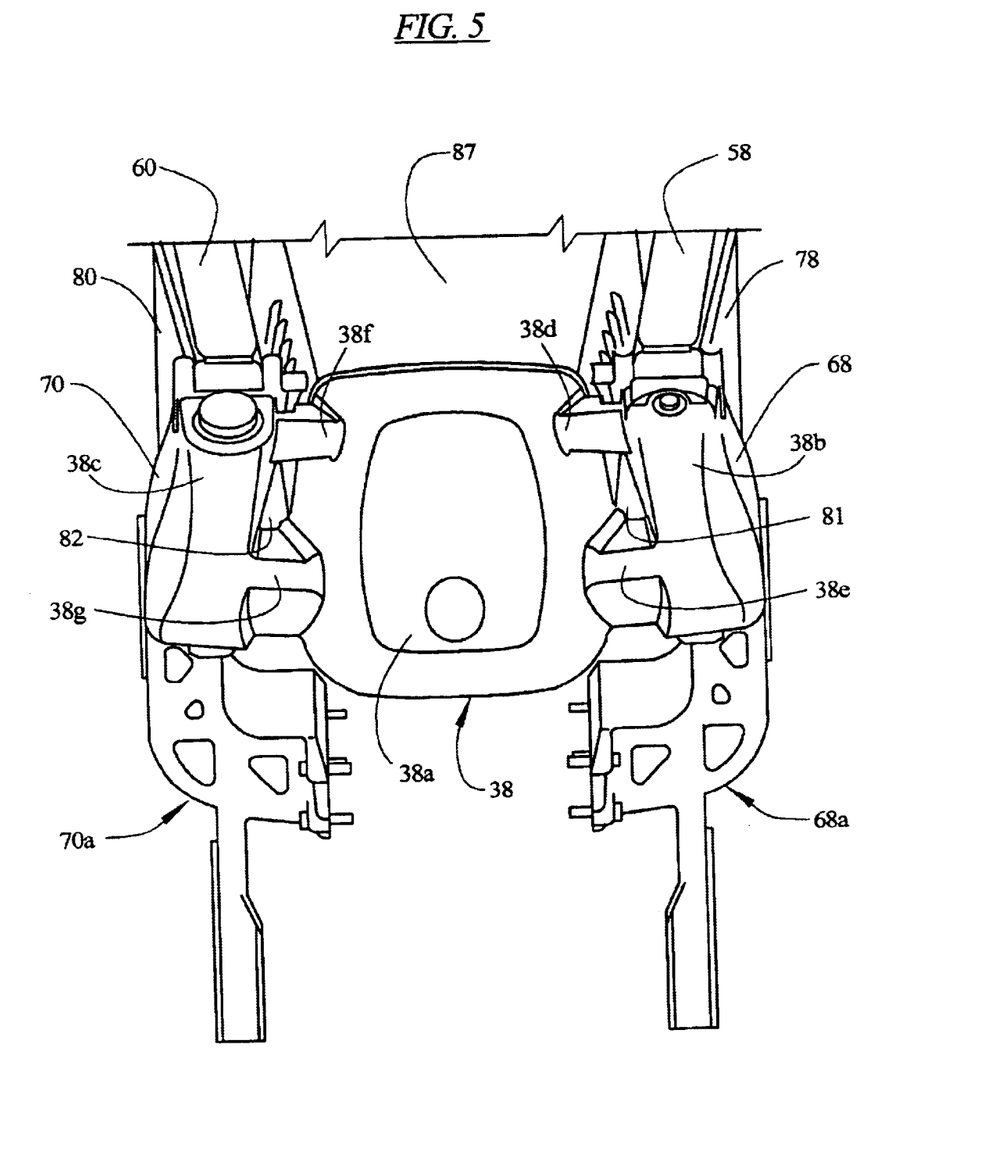
FIG. 5 is an enlarged perspective view of a portion of the tractor shown in FIG. 4.
Figure 6:
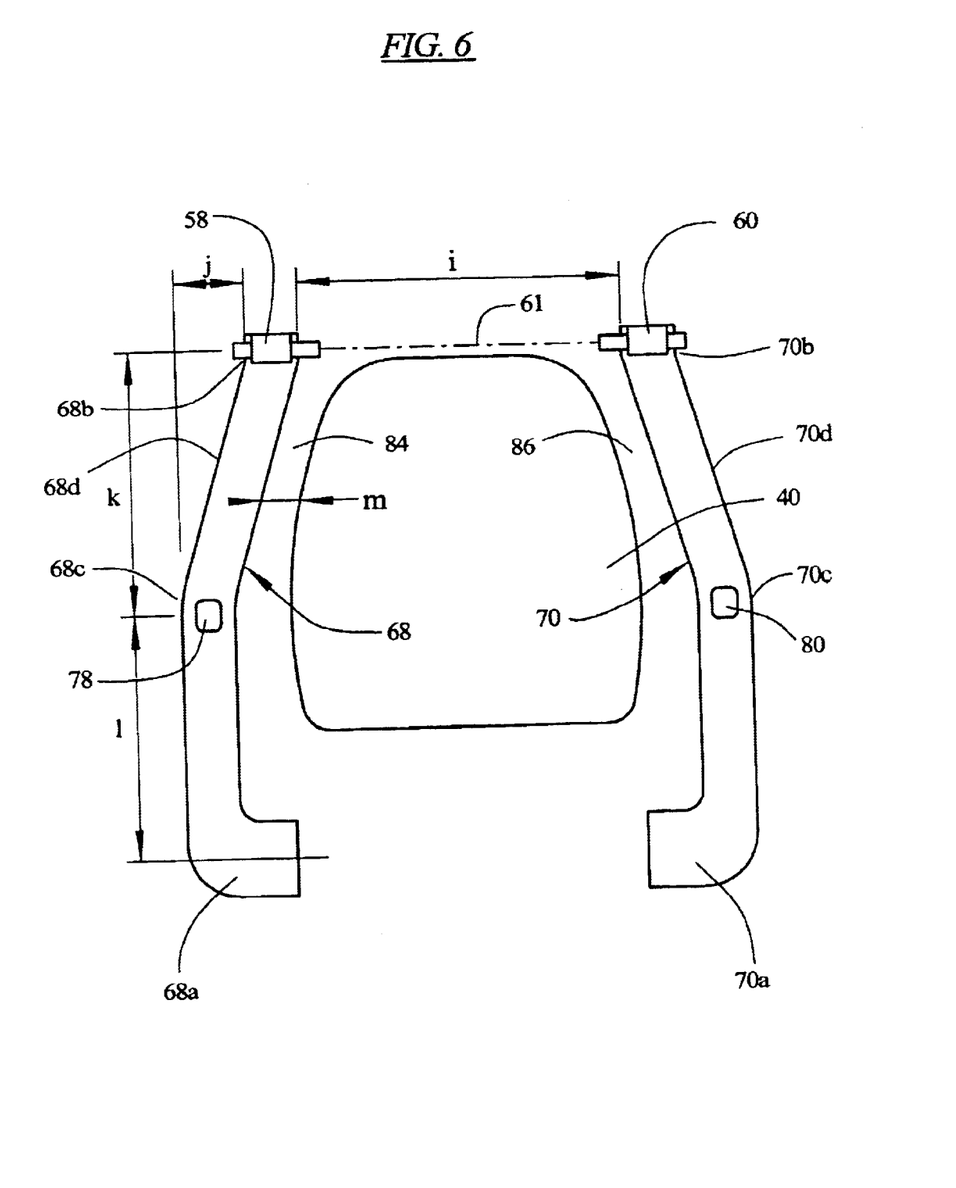
FIG. 6 is an enlarged schematical sectional view taken generally along lines 6—6 of FIG. 2.

A loader bucket 52 is provided on a front of the tractor 20. The loader bucket 52 is supported on a boom comprising two symmetrical boom arms 58, 60. Substantially vertical towers 68, 70 have base ends 68a, 70a that are curved inwardly to be fixed to the chassis 24, as shown in FIGS. 5 and 6. The boom arms 58, 60 have base ends 58a, 60a that are pivotally connected on a lateral pivot axis 61 (shown in FIGS. 2 and 6) to distal ends 68b, 70b of the towers. The boom arms 58, 60 are pivotally connected at distal ends 58b, 60b to the bucket 52.

Hydraulic cylinders 78, 80 are pivotally attached between a mid-location 68c, 70c of each of the towers 68, 70 and a mid-location 58c, 60c of each of the respective boom arms 58, 60. Extension of the cylinders 78, 80 raises the distal ends 58b, 60b of the boom arms 58, 60, and retraction of the cylinders 78, 80 lowers the distal ends 58b, 60b of the boom arms 58, 60.

As illustrated in FIG. 6, the towers 68, 70 extend upwardly for a distance to the mid-location 68c, 70c which is the connection point of the hydraulic cylinders 78, 80 and then continue upwardly and are angled, curved, tapered or otherwise offset inwardly to the distal ends 68b, 10b of the towers at the connection of the boom arms 58, 60. The inward offset of the towers creates a recessed outer, upper edge 68d, 10d that allows the operator to view the side edges of the bucket 52 from his seated position, with. possibly only a small lateral movement of the operator's head.

In this regard, the boom arms 58, 60 extend rearward from the bucket 52 in a parallel fashion, widely spaced apart, to the mid-position 58c, 60c where the cylinders 78, 80 are connected, and from that point are also curved, angled, are tapered or are otherwise offset, inwardly to the connection of the boom arms to the towers. The offset boom arms also enable an unobstructed view to the side edges 52a, 52b of the bucket 52.

Figure 4:
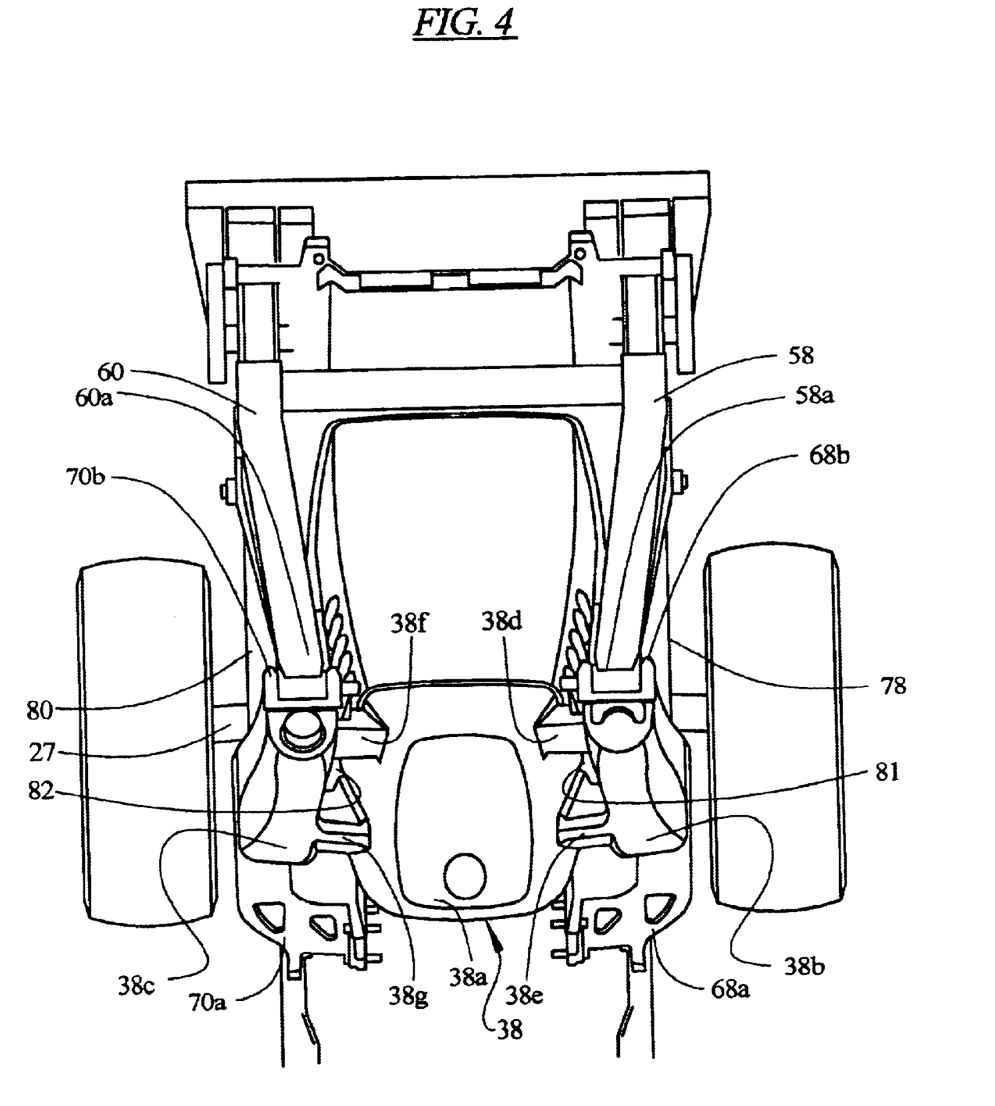
FIG. 4 is an enlarged perspective view of the tractor of FIG. 1 from a driver's view with portions of the tractor not shown for clarity.

As illustrated in FIGS. 4 and 5, the fuel tank 38 is mounted to cover a rear surface of the engine compartment and a rear surface of the towers 68, 70 that substantially faces the driver. The fuel tank 38 is a complex shaped container that includes a central portion 38a and two wing portions 38b, 38c connected to the central portion 38a by upper and lower tube portions 38d, 38e and 38f, 38g, respectively. Gaps 81, 82 are formed between the wing portions 38b, 38c and the central portion 38a. These gaps 81, 82 coincide with lateral spaces 84, 86 (shown in FIG. 6) formed between the hood 40 and the towers 68, 70 and allow an unobstructed downward oblique view of the utility vehicle axle 27 and the ground below. The wing portions 38b, 38c are tapered or otherwise contoured inwardly at sides thereof to match the inward offset of the towers 68, 70.

To additionally improve driver visibility, the hood 40 includes a top surface 87 that is steeply declined in a forward direction. The steep decline of the hood 40 allows an unobstructed driver view of a top edge 52c of the bucket when the tractor and the bucket are resting on level ground.

Because of the improved towers, boom, hood and fuel tank, an increased visibility of the bucket and ground below the tractor is achieved. This allows for close control of the tractor to move the bucket along a physical border or edge, such as to closely landscape an edge along a structure, or to control the bucket depth.

The dimensions for one example of a preferred embodiment of the present invention are as follows:

| | dimension |
|---|---|
| horizontal distance "a" from driver's eye 100 to top edge of hood | 994 mm |
| horizontal distance "b" from top edge of hood to top edge of grill | 1,012 mm |
| horizontal distance "c" from top edge of grille to top edge of bucket | 1,037 mm |
| vertical distance "d" from driver's eye to top edge of hood | 551 mm |
| vertical distance "e" from top edge of hood to top edge of grille | 433 mm |
| vertical distance "f" from driver's eye to top edge of bucket | 1,353 mm |
| distance from "g" connection of boom to tower to inflection point of boom | 995 mm |
| horizontal clearance "h" between boom arms after inflection point | 778 mm |
| horizontal clearance "i" between towers at distal ends | 523 mm |
| horizontal offset "j" of outer surface of towers | 56 mm |
| vertical distance "k" between top of tower and midpoint connection of hydraulic cylinder | 450 mm |
| vertical distance "l" between midpoint connection of hydraulic cylinder and bottom of outer surface | 478 mm |

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A utility vehicle comprising:
   a chassis supported on wheels;
   a loader bucket;
   a pair of towers supported on said chassis and extending substantially vertically;
   a pair of boom arms pivotally connected at base ends thereof to tops of said towers, respectively, and connected at distal ends thereof to said loader bucket; and
   said towers providing substantially vertical load paths therethrough between the boom arms and the chassis, said towers shaped to provide a laterally displaced load path through a portion of each of said substantially vertical load paths changing said substantially vertical load paths from closer together at tops of said towers to further apart at bottoms of said towers, a clearance distance between said towers being greater at bottoms of said towers than at tops of said towers.

2. The utility vehicle according to claim 1, wherein said towers extend from base ends of said towers toward distal ends of said towers substantially in parallel and have angled portions that are angled obliquely toward each other at a position on each tower substantially midway between said base end and said distal end of each tower.

3. A utility vehicle comprising:
   a chassis supported on wheels;
   a loader bucket;
   a pair of towers supported on said chassis and extending substantially vertically, said towers shaped to have outside edges that are further apart at a bottom thereof and closer at a top thereof;
   a pair of boom arms pivotally connected at base ends thereof to tops of said towers, respectively, and connected at distal ends thereof to said loader bucket; and
   a fuel tank mounted onto a rearward facing surface of said towers and having a lateral outside contour that matches said towers.

4. A utility vehicle comprising:
   a chassis supported on wheels;
   a loader bucket;
   a pair of towers supported on said chassis and extending substantially vertically, said towers shaped to have outside edges that are further apart at a bottom thereof and closer at a top thereof;

a pair of boom arms pivotally connected at base ends thereof to tops of said towers, respectively, and connected at distal ends thereof to said loader bucket; and an engine compartment supported on said chassis behind said loader bucket, a fuel tank, and a hood covering at least a top of said engine compartment, wherein said towers are laterally spaced from said hood forming two spaces on opposite lateral sides of said hood, and said fuel tank includes two gaps which coincide with the two spaces between said towers and said hood.

5. The utility vehicle according to claim 4, wherein said hood has a top surface that declines from an end closest to the fuel tank to an opposite end closest to the loader bucket, said top surface allowing an operator to view a top edge of said bucket when said bucket and wheels are set on level ground.

6. A utility vehicle comprising:
a chassis supported on wheels;
a loader bucket;
a pair of towers supported on said chassis and extending substantially vertically;
a pair of boom arms pivotally connected at base ends thereof to tops of said towers, respectively, and connected at distal ends thereof to said loader bucket; and
said towers providing substantially vertical load paths therethrough between the boom arms and the chassis, said towers shaped to provide a laterally displaced load path through a portion of each of said substantially vertical load paths changing said substantially vertical load paths from closer together at tops of said towers to further apart at bottoms of said towers;
wherein said boom arms extend from said distal ends of said boom arms toward said base ends of said boom arms substantially in parallel and are offset toward each other at a position on each boom arm substantially midway between said base end and said distal end of each boom arm.

7. A utility vehicle comprising:
a chassis supported on wheels;
a loader bucket;
a pair of towers supported on said chassis and extending substantially vertically;
a pair of boom arms pivotally connected at base ends thereof to tops of said towers, respectively, and connected at distal ends thereof to said loader bucket; and
said towers providing substantially vertical load paths therethrough between the boom arms and the chassis, said towers shaped to provide a laterally displaced load path through a portion of each of said substantially vertical load paths changing said substantially vertical load paths from closer together at tops of said towers to further apart at bottoms of said towers;
wherein said boom arms are closer together at said base ends thereof than at said distal ends thereof.

8. A utility vehicle comprising:
a chassis supported on wheels;
a loader bucket;
a pair of towers supported on said chassis and extending substantially vertically;
a pair of boom arms pivotally connected at base ends thereof to tops of said towers, respectively, and connected at distal ends thereof to said loader bucket, said boom arms extending in parallel from said loader bucket rearward and at a substantially midway position being angled inwardly toward each other continuously from said midway position to said base ends.

9. A utility vehicle comprising:
a chassis supported on wheels;
a loader bucket;
a pair of towers supported on said chassis and extending substantially vertically;
a pair of boom arms pivotally connected at base ends thereof to tops of said towers, respectively, and connected at distal ends thereof to said loader bucket, said boom arms extending in parallel from said loader bucket rearward and at a substantially midway position being angled inwardly toward each other to said base ends;
wherein said towers are shaped to be further apart at a bottom thereof and closer together at a top thereof.

10. A utility vehicle comprising:
a chassis supported on wheels;
a loader bucket;
a pair of towers supported on said chassis and extending substantially vertically;
a pair of boom arms pivotally connected at base ends thereof to tops of said towers, respectively, and connected at distal ends thereof to said loader bucket, said boom arms extending in parallel from said loader bucket rearward and at a substantially midway position being offset inwardly toward each other to said base ends; and
a fuel tank mounted onto a rearward facing surface of said towers and having a matching outside lateral contour as said towers.

11. A utility vehicle comprising:
a chassis supported on wheels;
a loader bucket;
a pair of towers supported on said chassis and extending substantially vertically, said towers are shaped to be further apart at a bottom thereof and closer together at a top thereof;
a pair of boom arms pivotally connected at base ends thereof to tops of said towers, respectively, and connected at distal ends thereof to said loader bucket, said boom arms extending in parallel from said loader bucket rearward and at a substantially midway position being offset inwardly toward each other to said base ends; and
an engine compartment supported on said chassis behind said loader bucket, a fuel tank, and a hood covering at least a top of said engine compartment, wherein said towers are spaced from said hood forming two spaces on opposite lateral sides of said hood, and said fuel tank includes two gaps which coincide with the two spaces between said towers and said hood.

12. The utility vehicle according to claim 11, wherein said hood has a top surface that declines from an end closest to the fuel tank to an opposite end closest to the loader bucket, said declined top surface allowing an operator to view a top edge of said bucket when said bucket and said wheels are set on level ground.

13. The utility vehicle according to claim 12, wherein said towers extend from base ends of said towers toward distal ends of said towers substantially in parallel and are offset toward each other at a position on each tower substantially midway between said base end and said distal end of each tower.

14. A utility vehicle comprising:

a chassis supported on wheels;

a loader bucket;

a pair of towers supported on said chassis and extending substantially vertically;

a pair of boom arms pivotally connected at base ends thereof to tops of said towers, respectively, and connected at distal ends thereof to said loader bucket, said boom arms extending in parallel from said loader bucket rearward and at a substantially midway position being offset inwardly toward each other to said base ends; and wherein said towers extend from base ends of said towers toward distal ends of said towers substantially in parallel and are offset toward each other at a position on each tower substantially midway between said base end and said distal end of each tower.

15. A utility vehicle comprising:

a chassis supported on wheels;

a loader bucket;

a pair of towers supported on said chassis and extending substantially vertically, said towers having angled tower portions extending obliquely toward each other, said towers shaped to be further apart at a bottom thereof and closer at a top thereof; and a pair of boom arms pivotally connected at base ends thereof to tops of said towers, respectively, and connected at distal ends thereof to said loader bucket, said boom arms having angled boom arm portions extending obliquely toward each other in a rearward direction, said boom arms shaped to be closer together at said base ends than at said distal ends.

16. A utility vehicle comprising:

a chassis supported on wheels;

a loader bucket;

a pair of towers supported on said chassis and extending substantially vertically, said towers shaped to be further apart at a bottom thereof and closer at a top thereof;

a pair of boom arms pivotally connected at base ends thereof to tops of said towers, respectively, and connected at distal ends thereof to said loader bucket, said boom arms closer together at said base ends than at said distal ends; and a fuel tank mounted onto a rear surface of said towers and having an outside lateral contour that matches said towers.

17. A utility vehicle comprising:

a chassis supported on wheels;

a loader bucket;

a pair of towers supported on said chassis and extending substantially vertically, said towers shaped to be further apart at a bottom thereof and closer at a top thereof;

a pair of boom arms pivotally connected at base ends thereof to tops of said towers, respectively, and connected at distal ends thereof to said loader bucket, said boom arms closer together at said base ends than at said distal ends; and an engine compartment supported on said chassis behind said loader bucket and a fuel tank, and a hood covering at least a top of said engine compartment, wherein said towers are spaced from said hood forming two spaces on opposite lateral sides of said hood, and said fuel tank includes two gaps which coincide with the two spaces between said towers and said hood.

18. The utility vehicle according to claim 17, wherein said hood has a top surface that declines from an end closest to the fuel tank to an opposite end closest to the loader bucket, said declined top surface allowing an operator to view a top edge of said bucket when said bucket and said wheels are set on level ground.

19. A utility vehicle comprising:

a chassis supported on wheels;

a loader bucket;

a pair of towers supported on said chassis and extending substantially vertically, said towers shaped to be further apart at a bottom thereof and closer at a top thereof;

a pair of boom arms pivotally connected at base ends thereof to tops of said towers, respectively, and connected at distal ends thereof to said loader bucket, said boom arms closer together at said base ends than at said distal ends; and wherein said towers extend from base ends thereof toward distal ends thereof, substantially in parallel and are offset toward each other at a position on each tower substantially midway between said base end and said distal end of each tower.

20. The utility vehicle according to claim 19, wherein said boom arms extend from said distal ends of said boom arms toward said base ends of said boom arms substantially in parallel and are angled toward each other at a position on each boom arm substantially midway between said distal end and said base end of each boom arm.

* * * * *